United States Patent [19]

Hunter

[11] 4,403,071

[45] Sep. 6, 1983

[54] SULFATED ETHOXYLATED ACRYLIC ACID POLYMER PRODUCT

[75] Inventor: Walter D. Hunter, Houston, Tex.

[73] Assignee: Texaco Development Corp., White Plains, N.Y.

[21] Appl. No.: 355,037

[22] Filed: Mar. 5, 1982

Related U.S. Application Data

[60] Division of Ser. No. 231,646, Feb. 5, 1981, Pat. No. 4,341,647, which is a division of Ser. No. 75,635, Sep. 14, 1979, abandoned, which is a continuation-in-part of Ser. No. 916,985, Jun. 19, 1978, abandoned.

[51] Int. Cl.³ .................... C08F 8/36; C08F 20/04; C08F 20/38
[52] U.S. Cl. ................. 525/330.4; 525/344; 526/240; 526/287
[58] Field of Search .................. 525/330.4, 344; 526/287

[56] References Cited

U.S. PATENT DOCUMENTS 4,243,772 1/1981 Paul et al. .................... 525/344
4,288,427 9/1981 Farmer et al. ................ 525/344

*Primary Examiner*—Harry Wong, Jr.
*Attorney, Agent, or Firm*—Robert A. Kulason; Jack H. Park; Richard A. Morgan

[57] ABSTRACT

Hydrocarbons are recovered from a subterranean hydrocarbon-bearing formation penetrated by an injection well and a production well by displacing hydrocarbons toward the production well using a drive fluid such as water thickened with a copolymer of acrylamide and vinyl sulfonic acid or salts thereof and saturated with carbon dioxide and/or natural gas at the injection pressure. If desired, the drive fluid may contain a small amount of a sulfated or sulfonated, ethoxylated acrylic acid polymer.

3 Claims, No Drawings

SULFATED ETHOXYLATED ACRYLIC ACID POLYMER PRODUCT

This application is a division of application Ser. No. 06/231,646 filed Feb. 5, 1981, which was issued as U.S. Pat. No. 4,341,647 on July 27, 1982. U.S. Pat. No. 4,341,647 is a division of Ser. No. 06/075,635, filed Sept. 14, 1979, now abandoned, which is a continuation-in-part of Ser. No. 05/916,985, filed June 19, 1978, now abandoned.

BACKGROUND OF THE INVENTION

1. Field of the Invention

This invention relates to a process for recovering hydrocarbons from a subterranean hydrocarbon-bearing formation penetrated by an injection well and a production well wherein a drive fluid such as water thickened with a copolymer of acrylamide and vinyl sulfonic acid or the sodium, potassium or ammonium salt thereof is utilized to displace hydrocarbons in the formation toward a production well. The drive fluid employed is saturated with carbon dioxide and/or natural gas and may optionally contain a small amount of a water-soluble, sulfated or sulfonated, ethoxylated acrylic acid polymer.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

There is a definite need in the art for a water flooding process in which the disadvantages discussed above are largely eliminated or avoided.

SUMMARY OF THE INVENTION

This invention relates to a process for recovering hydrocarbons from a subterranean hydrocarbon-bearing formation penetrated by an injection well and a production well which comprises:
 (A) injecting into the formation via an injection well a drive fluid comprising water saturated with a material selected from the group consisting of (a) carbon dioxide and (b) natural gas at the injection pressure and having dissolved therein a small amount of a copolymer of acrylamide and vinyl sulfonic acid or the sodium, potassium or ammonium salt thereof and, if desired, about 0.01 to about 5.0 weight percent of a sulfated or sulfonated, ethoxylated acrylic acid polymer or the sodium, potassium or ammonium salt thereof,
 (B) forcing the said fluid through the formation and
 (C) recovering hydrocarbons through the production well.

In another embodiment of this invention the drive fluid may comprise water or brine having dissolved therein a small amount, i.e., about 0.01 to about 5.0 weight percent of a sulfated or sulfonated, ethoxylated acrylic acid or the sodium, potassium or ammonium salts of these sulfated or sulfonated, ethoxylated acrylic acid polymers.

An additional embodiment of this invention relates to the driving fluid compositions utilized in step (a).

DETAILED DESCRIPTION OF THE INVENTION

Prior to practicing the process of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressure of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferably that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.016 to about 0.093 inches).

The copolymers of acrylamide and vinyl sulfonic acid employed in this invention comprise recurring A-type units of the formula:

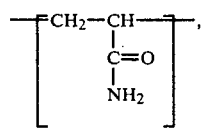

and recurring B-type units of the formula:

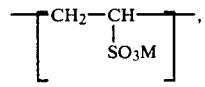

wherein M is selected from the group consisting of hydrogen, sodium, potassium and ammonium and wherein in the said copolymer the weight percent of the A-type units ranges from about 65 to about 95 with the balance being B-type units. Generally the number average molecular weights of the acrylamide-vinyl sulfonic acid copolymers will range from about 10,000 to about 2,000,000 or more. The copolymers of acrylamide-vinyl sulfonic acid and salts thereof are known materials which can be prepared by the usual vinyl compound polymerization methods. Preparation of such acrylamidevinyl sulfonic acid polymers is described in detail in Norton et al U.S. Pat. No. 3,779,917 which is incorporated herein in its entirety by reference.

As previously mentioned, the drive fluid of this invention also can contain dissolved therein, if desired, about 0.01 to about 5.0 weight percent of (1) a sulfated, ethoxylated acrylic acid polymer comprising recurring units of the formula:

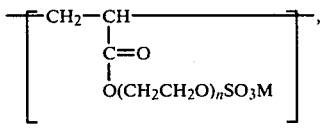

wherein n is an integer of from 1 to 5 and M is selected from the group consisting of hydrogen, sodium, potassium, and ammonium (Polymer G) or (2) a sulfonated, ethoxylated acrylic acid polymer comprising recurring units of the formula:

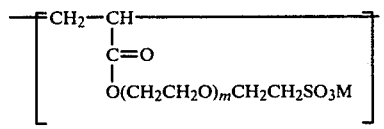

wherein m is an integer of from 1 to 4 and M has the same meaning as previously described (Polymer H). The number average molecular weight of Polymers G and H useful in this invention will vary from about 3,000 to about 50,000 or more.

The sulfated ethoxylated acrylic acid polymers described above can be prepared according to known methods by sulfating, for example, with sulfuric acid an ethoxylated acrylic acid polymer comprising repeating units of the formula:

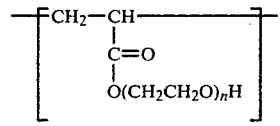

wherein n is an integer of from 1 to 5 and having a number average molecular weight of about 3,000 to about 50,000. The corresponding sodium, potassium or ammonium salts of these sulfated, ethoxylated acrylic acid polymers can be formed by neutralization with the corresponding alkali metal or ammonium hydroxide. The sulfated, ethoxylated acrylic acid polymers can be converted to the sulfonate by methods known in the art such as by reaction with sodium sulfite at elevated temperatures, e.g., 150°–190° C. for about 6 to about 10 hours.

The ethoxylated acrylic acid polymers utilized in preparing the novel sulfated and sulfonated polymers described above are known materials which can be prepared, for example, as set out in U.S. Pat. No. 3,880,765 (Nalco Chemical Company) which is incorporated herein in its entirety. For example, an aqueous solution comprising about 5 to about 20 weight percent or more of a homopolymer of acrylic acid in water along with about 0.5 weight percent or more of powdered potassium hydroxide or sodium hydroxide is charged to an autoclave and the autoclave and contents heated to a temperature of about 100° after which the required weight of ethylene oxide or a mixture of ethylene oxide and propylene oxide is pressured with nitrogen into the autoclave over a period of about 1 to about 4 hours or more. The autoclave is allowed to cool to room temperature and then vented. The oxyalkylated compound thus formed can be conveniently recovered by methods well known in the art. For example, the excess alkylene oxide and/or the diluent can be removed by evaporation yielding the water-soluble, alkoxylated acrylic acid.

A number of other methods are set out in the art for conducting such alkoxylation reactions including those described in U.S. Pat. Nos. 2,213,477; 2,233,381; 2,808,397; 2,131,142; 3,879,475; 2,174,761; 2,425,845; 3,062,747; 3,380,765; 3,892,720 and 2,808,397.

In the secondary recovery process of this invention, generally the aqueous drive fluid will contain dissolved therein from about 0.01 to about 5.0 weight percent or more of the acrylamide-vinyl sulfonic acid copolymer and, optionally, about 0.01 to about 5.0 weight percent of a water-soluble, sulfated or sulfonated, ethoxylated acrylic acid polymer. If desired, the aqueous drive fluids previously described may be saturated with carbon dioxide and/or natural gas at the injection pressure which generally will be from about 300 to about 3000 psig or more. The carbon dioxide, when included in the fluid, serves to reduce the viscosity of the in-place oil thus making it less difficult to displace the oil toward the production well. The addition of natural gas to the drive fluid tends to aid in maintaining the gas saturation of the reservoir and thus prevents at least to some extent any reduction in viscosity of the oil caused by such gas depletion.

If desired, the aqueous drive fluids having dissolved therein one or more of the above-described polymeric thickening agents may be made alkaline by addition of an alkaline agent. The advantageous results achieved with the aqueous alkaline medium used in the process of this invention are believed to be derived from the wettability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.005 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate and potassium carbonate.

A wide variety of surfactants such as linear alkylaryl sulfonates, alkyl polyethoxylated sulfates, etc. may also be included as a part of the aqueous drive fluid compositions previously described. Generally about 0.001 to about 1.0 or more weight percent of the surfactant will be included in the drive fluid.

This invention is best understood by reference to the following examples which are offered only as illustrative embodiments of this invention and are not intended to be limitative.

EXAMPLE 1

In a field in which the primary production has already been exhausted, an injection well is completed in the hydrocarbon-bearing formation and perforations are formed between the interval of 4955–4970 feet. A production well is drilled approximately 415 feet distance from the injection well, and perforations are similarly made in the same hydrocarbon-bearing formation at 4960–4975 feet.

The hydrocarbon-bearing formation in both the injection well and the production well is hydraulically fractured using conventional techniques, and a gravel-sand mixture is injected into the fracture to hold it open and prevent healing of the fracture.

In the next step water saturated with carbon dioxide at a pressure of about 1600 psig at a temperature of 60° F. to which there has been added about 0.14 weight percent sodium hydroxide and containing dissolved therein 0.32 weight percent of an acrylamide-vinyl sulfonic acid copolymer having a number average molecular weight of about 240,000 prepared in the manner described in Norton et al. U.S. Pat. No. 3,779,917 above is injected via the injection well into the formation at a pressure of 1620 psig and at the rate of 1 barrel per minute. In the acrylamide-vinyl sulfonic copolymer the weight percent of the acrylamide units is about 69 with the balance being vinyl sulfonic acid units. Injection of the driving fluid is continued at the rate of 1 barrel per minute and at the end of 70 days the rate of production of oil is substantially greater than with water injection alone.

EXAMPLE II

An injection well is drilled and completed in the hydrocarbon-bearing formation of a Berea field in which primary production has been exhausted and perforations are formed between the interval of 5630–5650 feet. A production well is drilled approximately 435 feet distance from the injection well, and perforations are similarly made in the same hydrocarbon-bearing formation at 5635–5655 feet.

The formation in both the injection well and the production well is hydraulically fractured using conventional techniques and employing the usual gravel-sand mixture as a propant to hold open the fracture.

Next, water saturated with carbon dioxide at a pressure of about 1450 psig at a temperature of 65° F. and containing dissolved therein 0.65 weight percent of an acrylamide-sodium vinyl sulfonate copolymer having a number average molecular weight of about 350,000 prepared in the manner described in Norton et al. U.S. Pat. No. 3,779,917 and also containing dissolved therein 0.15 weight percent of sulfated, ethoxylated acrylic acid homopolymer having a number average molecular weight of about 24,000 and consisting of recurring units of the formula:

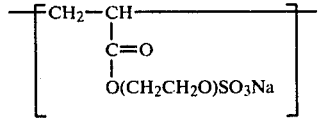

is injected via the injection well into the formation at a pressure of 1420 psig and at the rate of 1.2 barrels per minute. In the acrylamide-sodium vinyl sulfonate copolymer the weight percent of the acrylamide units is about 91 with the balance being the sodium vinyl sulfonate units. Injection of the driving fluid is continued at the rate of 1.2 barrels per minute and at the end of 85 days the rate of production of oil is substantially greater than with water injection alone.

What is claimed is:

1. A sulfated, ethoxylated acrylic acid polymer having recurring units of the formula:

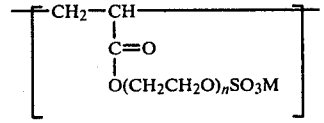

wherein n is an integer of from 1 to 5 and M is selected from the group consisting of hydrogen, sodium, potassium and ammonium.

2. The polymer of claim 1 wherein the number average molecular weight is about 3,000 to about 50,000.

3. The polymer of claim 1 where M is sodium.